United States Patent Office 3,014,840
Patented Dec. 26, 1961

3,014,840
IMPROVED FORMULATION OF CYCLOHEXIMIDE COMPOSITIONS AND PROCESS FOR THE CONTROL OF BLISTER RUST AND LIKE FUNGAL INFECTIONS IN TREES
Clement D. Vellaire, Richland Township, Kalamazoo County, Mich., assignor to The Upjohn Company, Kalamazoo, Mich., a corporation of Delaware
No Drawing. Filed Apr. 22, 1959, Ser. No. 808,009
9 Claims. (Cl. 167—33)

This invention relates to novel fungicidal compositions and is more particularly concerned with novel compositions containing cycloheximide as active ingredient which have been found to be valuable in the control of fungus infections in trees.

The high incidence of damage to standing trees due to fungal attack is a major problem in forestry both in the raising of nursery stock for ornamental and afforestation purposes and in established forests in which trees are being raised for lumber and for pulp. One of the most prevalent of fungus diseases in trees at the present time is that commonly known as blister rust (*Cronartium ribicola*) which attacks pines such as the western white pine (*Pinus monticola*), eastern or northern white pine (*P. strobus*), sugar pine (*P. lambertiana*), limber pine (*P. flexilis*), white bark pine (*P. albicaulis*), Mexican white pine (*P. ayacahuite*), foxtail pine (*P. balfouriana*), and bristlecone pine (*P. arista*). *Cronartium fustiforme*, a related organism, is of tremendous importance on southern pine species.

In some areas in the east, west and south of the United States in which large pine forests are established, the depredations caused by blister rust, and related rusts including fusiforme rust on southern pine species, are so great that as many as 80% of the nursery stock and established trees are destroyed. Hitherto, the disease could only be directly controlled effectively if infected branches were pruned before the fungus mycelium advanced into the trunk of the tree. Once the fungus was established in the trunk of the tree a high percentage of the infected trees was lost even though drastic excision of infected areas of bark was carried out.

Recently it has been shown by Moss [Plant Disease Reporter, 42, 703 (1958); ibid. 41, 709 (1957)], that good control of blister rust can be achieved, even where the fungus has become established in the trunk of the trees, by treatment with compositions containing cycloheximide as active ingredient. The original method of control adopted by Moss comprises excision of bark at the point of fungal attack to expose blister rust and other wood-rotting pathogens followed by application of a solution containing 150 p.p.m. of cycloheximide in Number 1 stove oil. The solution of cycloheximide in the oil was prepared by first dissolving the actidione in a small quantity of acetone and adding the acetone solution to the requisite amount of oil.

The present invention consists in compositions of cycloheximide which not only possess improved physical characteristics but which give improved control of blister rust and like fungal infections of trees. The compositions of the invention can take a number of different forms, to be described hereinafter, all of which are characterized by the fact that they contain cycloheximide in association with a polar solvent which is substantially immiscible with water, i.e., is soluble in water to the extent of less than 5% by volume at temperatures of the order of 20° C. to 30° C., which is miscible with a relatively non-volatile hydrocarbon oil as hereinafter defined, and in which cycloheximide is soluble to the extent of at least 0.1% by weight.

Solvents which fulfill the above requirements and which can be used in the compositions of the invention include acyclic aliphatic ketones which are substantially immiscible with water, such as methyl isopropyl ketone, methyl butyl ketone, methyl isobutyl ketone, methyl isoamyl ketone, diethyl ketone, di-n-propyl ketone, diisopropyl ketone, mesityl oxide, and the like; cyclo-aliphatic ketones such as cyclohexanone, alkylcyclohexanones, for example, methylcyclohexanone, dimethylcyclohexanone, and the like, cyclohexenone and alkylcyclohexenones, for example, isophorone, and the like; and lower-alkyl esters of saturated aliphatic carboxylic acids such as ethyl acetate, butyl acetate, amyl acetate, ethyl propionate, ethyl butyrate, and the like.

Thus the compositions of the invention include concentrates from which compositions can be prepared for the control of blister rust and other fungal infections of trees. Said concentrates can be prepared by dissolving cycloheximide in a water-immiscible polar solvent as hereinbefore defined. The concentration of cycloheximide in said concentrates can vary over a wide range, for example, from about 0.1 to about 30 percent. Advantageously the amount of cycloheximide present in the concentrates is of the order of about 1 to about 10 percent and preferably is of the order of about 3 to about 5 percent. These concentrates are stable and can be stored and transported without risk of fire, explosion, and loss of solvent by leakage and evaporation.

The compositions of the invention also include compositions obtained by diluting the concentrates described above with a relatively non-volatile hydrocarbon oil, i.e., a hydrocarbon oil having a boiling point of at least 200° C. at atmospheric pressure. Suitable such oils include horticultural summer spray oils, kerosene, Mobisol 100, and the like, and fuel oils such as No. 1 stove oil, and the like. The concentration of cycloheximide in such compositions is advantageously of the order of about 25 to about 500 p.p.m. and is preferably of the order of about 100 to about 200 p.p.m. The proportion of the water-immiscible polar solvent present in the emulsifiable concentrates is advantageously of the order of about 0.2 to about 15 parts by volume per 100 parts of the relatively non-volatile oil. These compositions can be used directly in the control of blister rust and other fungus infections by application to the affected areas of the tree. The application can be effected conveniently by spraying or by brushing the composition over the affected areas. The above compositions possess advantages over similar compositions, in which the cycloheximide is present in the relatively non-volatile oil in association with a water-miscible solvent such as acetone, in that when the compositions are in contact with water or with aqueous fluids less cycloheximide passes into the aqueous phase from the compositions of the invention than from compositions which contain water-miscible solvents such as acetone. This advantage is of considerable practical importance. Thus, heavy rainstorms, occurring after application of the compositions of the invention to trees, cause a much lower degree of elution of cycloheximide from the treated areas. Further the rate at which cycloheximide passes into the sap of the treated tree is slower in the case of the compositions of the present invention, and hence an effective amount of cycloheximide is supplied to the treated area over a much longer period of time, than when employing a composition containing a water-miscible solvent such as acetone. In addition it has been found that spraying of trees with the above compositions will consistently control inaccessible cankers (areas of fungal infection) which are situated as much as 20 feet above the level at which the trees are sprayed. Such control of inaccessible cankers cannot be achieved using compositions in which the cycloheximide is present in the relatively non-volatile oil in association with a water-miscible solvent such as acetone.

The compositions of the invention also include emulsifiable concentrates and the oil-in-water emulsions derived by pouring said concentrates into water. The emulsifiable concentrates comprise cycloheximide in solution in a mixture of a water-immiscible polar solvent as hereinbefore defined, a relatively non-volatile hydrocarbon oil as hereinbefore defined, and a surfactant. Suitable surfactants include nonionic surfactants such as polyoxyethylene sorbitol fatty acid esters (Atlox 1086), polyglycol esters of fatty acids (emulsifiers 2, 3, and M–0–1, Kessler Chemical Co.), fatty acid alkanolamides (Ninol 201), polyethoxy ester-amides (Leyco E–150), alkyl phenyl polyethylene glycol ethers (Tergitol NPX, Tergitol NP–27, Triton NP–56, Triton X–45, Triton X–100), and modified phthalic glycerol alkyd resins (Triton B–1956) and anionic surfactants such as ethylene oxide aromatic sulfonate condensates (Agrimul GA), amine salts of fatty alcohol sulfonates (Duponol G), amine salts of alkylaryl sulfonates (Ninate 411, Trepolate–YLA), blends of sulfonated oils and polyalcohol carboxylic acid esters (Emcol H–77), and blends of polyoxyethylene ethers and oil-soluble sulfonates (Emcol H–400).

The concentration of cycloheximide present in said emulsifiable concentrates can vary within wide limits but is generally within the range of about 0.1 to about 30 percent by weight. Preferably the concentration of cycloheximide is of the order of about 3 to about 5 percent by weight. The proportion of the water-immiscible polar solvent present in the emulsifiable concentrates is advantageously of the order of about 0.2 to about 15 parts by volume per 100 parts of the relatively non-volatile hydrocarbon oil. The proportion of surfactant employed in the emulsifiable concentrates is advantageously within the range of about 0.2 part to about 15 parts per 100 parts of the non-volatile hydrocarbon oil.

The emulsifiable concentrates described above can be added to water to form oil-in-water emulsions which can be applied directly to infected trees for the control of blister rust and other fungal infections. Said oil-in-water emulsions are particularly useful for application by hand, ground driven, and helicopter mechanical sprayers to infected upper limbs of trees, which limbs would be difficult, if not impossible, to treat by brushing with the fungicidal composition. The oil-in-water emulsions of the invention possess advantages over similar compositions in which the water-immiscible polar solvent is replaced by a water-miscible volatile solvent such as acetone, in that a greater proportion of the cycloheximide is present in the oil phase. After application of the emulsion to the tree, the aqueous phase evaporates at a rapid rate and that proportion of cycloheximide which was present in the aqeuous phase is dissipated rapidly from the site of the fungal infection by weathering processes etc. In contrast, the polar, water-immiscible, high boiling solvent remains in the oil thus retaining an effective concentration of cycloheximide at the absorption site. Hence it is preferable that the amount of cycloheximide in the aqueous phase of the emulsion be as small as possible and the oil-in-water emulsions of the present invention are accordingly valuable on this account. Further the cycloheximide present in the oil phase of the emulsion will, after application to the area of tree to be treated, be released therefrom at a slow rate and be less subject to elution by rain, evaporation, etc., for reasons hereinbefore described.

The concentration of cycloheximide in the oil-in-water emulsions of the invention is advantageously of the order of about 25 to about 500 p.p.m. and is preferably of the order of about 100 to about 200 p.p.m. The proportion of water-immiscible polar solvent to relatively non-volatile hydrocarbon oil present in the oil-in-water emulsions will, of course, be the same as that in the emulsifiable concentrates from which the emulsions are prepared.

The present invention also includes a process for the control of blister rust and like fungal infections of trees which process comprises applying to the infected areas of the trees a composition containing cycloheximide in association with a water-immiscible polar solvent as hereinbefore defined and a relatively non-volatile hydrocarbon oil as hereinbefore defined. The composition to be applied may take the form of a solution of cycloheximide in the water-immiscible polar solvent and the relatively non-volatile hydrocarbon oil as described above or an oil-in-water emulsion prepared as described above.

The concentration of cycloheximide in the compositions employed in the process of the invention is advantageously of the order of about 25 to about 500 p.p.m. and is preferably of the order of about 100 to about 200 p.p.m.

The precise method of applying cycloheximide compositions to the infected trees depends upon the circumstances. Where only a few trees are to be treated, the bark covering the infected area in each tree may be removed and the excised surface of the tree then treated with the cycloheximide composition, for example, by application of the composition using a paint brush or similar instrument. An an alternative to complete removal of the bark from the infected area, the bark may be slit vertically in one or more places and the cycloheximide composition applied liberally to the area.

Where a large number of trees are to be treated it is preferable to employ the cycloheximide compositions using the basal stem spray method. This method consists in spraying the hole of the lower trunk and lower branches of each tree with the cycloheximide composition without excision of bark etc. The spraying can be accomplished readily using mechanical spraying equipment and the basal stem spray method can be employed to treat large numbers of trees in a short period of time. The oil compositions of the invention are particularly suitable for use in this basal stem spray method. It is to be understood that the process of the invention includes all of the above described methods of application of the cycloheximide compositions.

The following examples are illustrative of the process and products of the present invention, but are not to be construed as limiting.

*Example 1*

An oil soluble concentrate was prepared by dissolving 384 g. of cycloheximide in 10 liters of cyclohexanone which had previously been redistilled. The resulting solution contained 4.06% w./w. of cycloheximide.

Similar compositions can be prepared by replacing the cyclohexanone with amyl acetate, butyl acetate, butyl propionate, methyl isopropyl ketone, methyl isobutyl ketone, methyl isoamyl ketone, ethyl isopropyl ketone, and ethyl isobutyl ketone.

The compositions so obtained can be diluted with No. 1 fuel oil at the rate of 4 fluid ounces of concentrate to 8 gallons of fuel oil to obtain compositions containing 150 p.p.m. of cycloheximide. These compositions when applied to western white pine trees infected with blister rust gave 100 percent control of the disease.

*Example 2*

A composition was prepared by dissolving 3 g. of cycloheximide in a mixture of 2 liters of cyclohexanone, previously redistilled, and 20 liters of Mobisol 100 (a hydrocarbon oil). The resulting solution contained 0.019% w./w. (190 p.p.m.) of cycloheximide. This composition when applied by the basal stem spray method to trees infected with blister rust gave 100 percent control of the disease.

Similar compositions can be obtained by replacing the cyclohexanone in the above formulation with amyl acetate, butyl acetate, butyl propionate, methyl isopropyl ketone, methyl isobutyl ketone, methyl isoamyl ketone, ethyl isopropyl ketone and ethyl isobutyl ketone.

Example 3

An emulsifiable concentrate is prepared by admixing the following ingredients. All parts are by weight.

| | Parts |
|---|---|
| Cycloheximide | 1.5 |
| Cyclohexanone | 14 |
| Mobisol 100 (a hydrocarbon oil) | 80.5 |
| Leyco E-150 (a polyethoxy ester-amide) | 4 |

One part by volume of the emulsifiable concentrate so obtained can be poured into 100 parts by volume of water to obtain an oil-in-water emulsion containing 150 p.p.m. of cycloheximide. This emulsion can be used for the treatment of trees infected with blister rust and like fungal infections.

It is to be understood that the invention is not to be limited to the exact details of operation or compositions shown and described, as obvious modifications and equivalents will be apparent to one skilled in the art, and the invention is therefore to be limited only by the scope of the appended claims.

I claim:

1. A composition suitable for the control of blister rust and like fungal infections in trees which comprises an effective amount of cycloheximide in association with a polar solvent having a solubility in water of less than about 5.0 percent by volume, and a non-volatile hydrocarbon oil in the proportions of about 0.2 part to about 15 parts of polar solvent per 100 parts of hydrocarbon oil.

2. A composition suitable, after dilution with a non-volatile hydrocarbon oil, for the control of blister rust and like fungal infections in trees, which comprises cycloheximide in a concentration of from about 1 to about 10 percent in association with a polar solvent having a solubility in water of less than about 5.0 percent by volume.

3. An emulsifiable concentrate suitable for dilution with water to give a composition for the control of blister rust and like fungal infections in trees, which comprises an effective amount of cycloheximide in association with a polar solvent having a solubility in water of less than about 5.0 percent by volume, a non-volatile hydrocarbon oil and a surfactant, the polar solvent being present in the proportion of about 0.2 part to about 15 parts per 100 parts of hydrocarbon oil.

4. An oil-in-water emulsion suitable for use in the control of blister rust and like fungal infections in trees, which comprises an effective amount of cycloheximide in association with a polar solvent having a solubility in water of less than about 5.0 percent by volume, a non-volatile hydrocarbon oil, a surfactant and water, the polar solvent being present in the proportion of about 0.2 part to about 15 parts per 100 parts of hydrocarbon oil.

5. A composition suitable for use in the control of blister rust and like fungal infections in trees which comprises a solution of cycloheximide in a mixture of a polar solvent having a solubility in water of less than about 5.0 percent by volume, and a non-volatile hydrocarbon oil, the cycloheximide being present in a concentration of from about 25 to about 500 parts per million, and the polar solvent being present in the proportion of about 0.2 part to about 15 parts per 100 parts of hydrocarbon oil.

6. A composition suitable for use in the control of blister rust and like fungal infections in trees which comprises a solution of cycloheximide in a mixture of cyclohexanone and a non-volatile hydrocarbon oil, the cycloheximide being present in a concentration of from about 50 to about 500 parts per million, and the cyclohexanone being present in the proportion of about 0.2 part to about 15 parts per 100 parts of hydrocarbon oil.

7. A process for the control of blister rust and like fungal infections in trees which comprises treating the infected trees with a composition containing an effective amount of cycloheximide in association with a polar solvent having a solubility in water of less than about 5.0 percent by volume, and a relatively non-volatile hydrocarbon oil, said polar solvent being present in the proportion of about 0.2 part to about 15 parts per 100 parts of hydrocarbon oil.

8. A composition suitable, after dilution with a non-volatile hydrocarbon oil, for the control of blister rust and like fungal infections in trees, which comprises cycloheximide in association with cyclohexanone, the concentration of cycloheximide in said composition being within the range of about 1 to about 10 percent.

9. A process for the control of blister rust and like fungal infections in trees which comprises treating the infected trees with a composition containing an effective amount of cycloheximide in association with cyclohexanone and a relatively non-volatile hydrocarbon oil, the cyclohexanone being present in the proportion of about 0.2 to about 15 parts per 100 parts of hydrocarbon oil.

References Cited in the file of this patent

UNITED STATES PATENTS

| 2,574,519 | Whiffen et al. | Nov. 13, 1951 |
| 2,894,872 | Murray | July 14, 1959 |

OTHER REFERENCES

Strong et al.: Plant Disease Rept., vol. 39, No. 7, p. 569, July 15, 1955.

Young et al.: Plant Disease Rept., vol. 35, No. 12, p. 540, December 15, 1951.

Ford et al.: J.A.C.S., vol. 70, pp. 1223–25 (p. 1225 relied on), March 1948.

Scheflan et al.: The Handbook of Solvents, pp. 85–87, 99–102 and 340–342, 1953.

1953 U.S.D.A. Yearbook of Agriculture, "Plant Diseases," pp. 115–120, "Bases of Controls—How Fungicides Have Been Developed," by Dunegan et al., published by U.S. Dept. of Agriculture.

V. D. Moss: "Acti-Dione Stove Oil Treatment of Blister Rust Trunk Cankers on Reproduction and Pale Western White Pine," in Plant Disease Reporter, vol. 42, No. 5, May 15, 1958, pp. 703–4, ibid, 41, p. 703 (1957).

Forestry: "Drug Treatment Saves Western White Pine," in Science News Letter for August 24, 1957, page 120 (citing V. D. Moss, supra).